United States Patent
Thorburn et al.

(10) Patent No.: US 9,312,696 B2
(45) Date of Patent: Apr. 12, 2016

(54) METHOD AND ASSOCIATED TRANSMISSION SYSTEM

(71) Applicant: ABB TECHNOLOGY LTD, Zurich (CH)

(72) Inventors: Stefan Thorburn, Västerås (SE); Nicklas Johansson, Västerås (SE)

(73) Assignee: ABB TECHNOLOGY LTD, Zürich (CH)

( * ) Notice: Subject to any disclaimer, the term of this patent is extended or adjusted under 35 U.S.C. 154(b) by 0 days.

(21) Appl. No.: 14/430,632

(22) PCT Filed: Oct. 2, 2012

(86) PCT No.: PCT/EP2012/069467
§ 371 (c)(1),
(2) Date: Mar. 24, 2015

(87) PCT Pub. No.: WO2014/053171
PCT Pub. Date: Apr. 10, 2014

(65) Prior Publication Data
US 2015/0295509 A1 Oct. 15, 2015

(51) Int. Cl.
*H02J 1/00* (2006.01)
*H02J 3/00* (2006.01)
*H02J 3/36* (2006.01)
*H02J 3/38* (2006.01)
*H02J 5/00* (2006.01)
*H02M 7/04* (2006.01)

(52) U.S. Cl.
CPC ... *H02J 3/36* (2013.01); *H02J 3/38* (2013.01); *H02J 5/00* (2013.01); *H02M 7/04* (2013.01); *Y10T 307/658* (2015.04)

(58) Field of Classification Search
CPC ............... H02J 3/36; H02J 3/38; H02J 5/00; Y10T 307/658; Y10T 307/707; Y10T 307/729; H02M 7/04
USPC ................................ 307/72, 82, 86
See application file for complete search history.

(56) References Cited

U.S. PATENT DOCUMENTS

2012/0201059 A1    8/2012 Berggren et al.
2013/0193766 A1*   8/2013 Irwin .............. H02H 7/268
                                              307/82

* cited by examiner

*Primary Examiner* — Carlos Amaya
(74) *Attorney, Agent, or Firm* — Birch, Stewart, Kolasch & Birch, LLP

(57) ABSTRACT

It is presented a method executed in a transmission system, the transmission system comprising an AC grid, a DC grid and at least two AC/DC converters connected between the AC grid and DC grid. The method comprises the steps of: obtaining set points for each one of the at least two AC/DC converters, each set point comprising a magnitude and direction of power through the respective AC/DC converter during normal operation generating, based on the set points, a virtual AC grid, the virtual AC grid corresponding to AC behavior of the DC grid, as viewed from each AC side of the at least two AC/DC converters; and controlling the at least two AC/DC converters to mimic a behavior in accordance with the virtual AC grid. A corresponding transmission system is also presented.

20 Claims, 4 Drawing Sheets

METHOD AND ASSOCIATED TRANSMISSION SYSTEM

TECHNICAL FIELD

The invention relates to a method and associated transmission system for controlling components of the transmission system.

BACKGROUND

AC (Alternating Current) grids have been used for a long time for power transmission. In more recent years, there is an increase in interest for DC (Direct Current) links, and in particular HVDC (High Voltage Direct Current) for power transmission. These DC links can be connected in DC grids with increasing complexity.

Typically, a DC grid is connected with the AC grid. However, such interconnection increases control complexity and may result in unpredictable and possibly undesired behaviour, e.g. after faults on transmission lines or nodes in the resulting transmission system.

SUMMARY

It is an object to provide a way to better diagnose and troubleshoot a transmission system comprising both an AC grid and a DC grid.

According to a first aspect, it is presented a method executed in a transmission system, the transmission system comprising an AC grid, a DC grid and at least two AC/DC converters connected between the AC grid and DC grid. The method comprises the steps of: obtaining set points for each one of the at least two AC/DC converters, each set point comprising a magnitude and direction of power through the respective AC/DC converter during normal operation; obtaining measurements for each one of the at least two AC/DC converters; generating, based on the set points and the measurements, a virtual AC grid, the virtual AC grid corresponding to AC behaviour of the DC grid, as viewed from each AC side of the at least two AC/DC converters; and controlling the at least two AC/DC converters to mimic a behaviour in accordance with the virtual AC grid.

Once the virtual AC grid is established, the transmission system can be treated as a pure AC system. Since the controller then controls the AC/DC converters to mimic the behaviour in accordance with the virtual AC grid, e.g. by keeping a virtual impedance constant, a more predictable and desired behaviour is achieved, particularly when faults occur. For example, the virtual impedance can be kept constant by allowing the power through each AC/DC converter to vary. In another example, some virtual impedances could be allowed to vary on some virtual AC lines, e.g. to dampen electromagnetic oscillations in the surrounding, real, AC grid.

The step of controlling may comprise controlling the at least two AC/DC converters to mimic only active power behaviour in accordance with the virtual AC grid. This means that the reactive power control capability of the AC/DC converters can be used for controlling the AC voltages at the connection points to the DC grid to desirable values.

The step of controlling may comprise controlling the at least two AC/DC converters to mimic only reactive power behaviour in accordance with the virtual AC grid.

The step of generating a virtual AC grid may comprise generating a matrix describing the relationship between current and voltage between each one of the at least two AC/DC converters through the DC grid.

The matrix may be an admittance matrix for the virtual AC grid. Such tools are well known from the art, opening up a whole range of tools and techniques commonly used for AC grids, to be used on the virtual AC grid, which in fact represents the DC grid.

The step of controlling may comprise the sub-step, for each one of the at least two AC/DC converters, of: obtaining control measurements of voltage magnitude and voltage phase angle of the AC side of every other one of the at least two AC/DC converters.

The step of obtaining control measurements may comprise low pass filtering the measurements with low pass filter of a frequency being lower than a frequency corresponding to a time delay of communicating the measurements. In this way, the control does not react to measurements which vary faster than the controller can perform any adjustments.

The step of controlling may comprise controlling to maintain a constant voltage phase angle, within a margin of error, on the AC side of each one of the at least two AC/DC converters. By maintaining a constant voltage phase angle, a direction of power flow is better maintained when faults occur.

The step of controlling may comprise controlling to maintain the magnitude of each phase angle less than the magnitude of each corresponding phase angle during normal operation, the phase angles being on the AC side of each one of the at least two AC/DC converters. In other words, the phase angle is not allowed to exceed the normal phase angles, even during a fault. This is another way to better maintain a direction of power flow when faults occur.

An asynchronous AC grid may be represented as a rotating electrical machine in the virtual AC grid.

The method may further comprise the step of: obtaining rules to be used for virtual AC grid generation; and the step of generating the virtual AC grid may comprise generating the virtual AC grid based on the rules.

The method may further comprise the step of: receiving user input to add a virtual component in the virtual AC grid; and wherein the step of generating the virtual AC grid comprises generating the virtual AC grid comprising the virtual component. In other words, an operator can manually adjust the topology of the virtual AC grid.

The virtual components may be selected from the group consisting of, inductors, resistors, capacitors, rotating electrical machines and phase shifting transformers.

One or more of the virtual components may be selected to be a negative resistor or a memristor. Such components can be useful when modelling the DC grid.

The method may further comprise the step of: displaying a graphical representation of the virtual AC grid.

The step of obtaining measurements may comprise obtaining a voltage magnitude and a voltage angle of the AC side of each one of the at least two AC/DC converters.

According to a second aspect, it is presented a transmission system comprising an AC grid, a DC grid, at least two AC/DC converters connected between the AC grid and DC grid, and a controller. The controller is arranged to: obtain set points for each one of the at least two AC/DC converters, each set point comprising a magnitude and direction of power through the respective AC/DC converter during normal operation; generate, based on the set points, a virtual AC grid, the virtual AC grid corresponding to AC behaviour of the DC grid, as viewed from each AC side of the at least two AC/DC converters; and control the at least two AC/DC converters to mimic a behaviour in accordance with the virtual AC grid.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
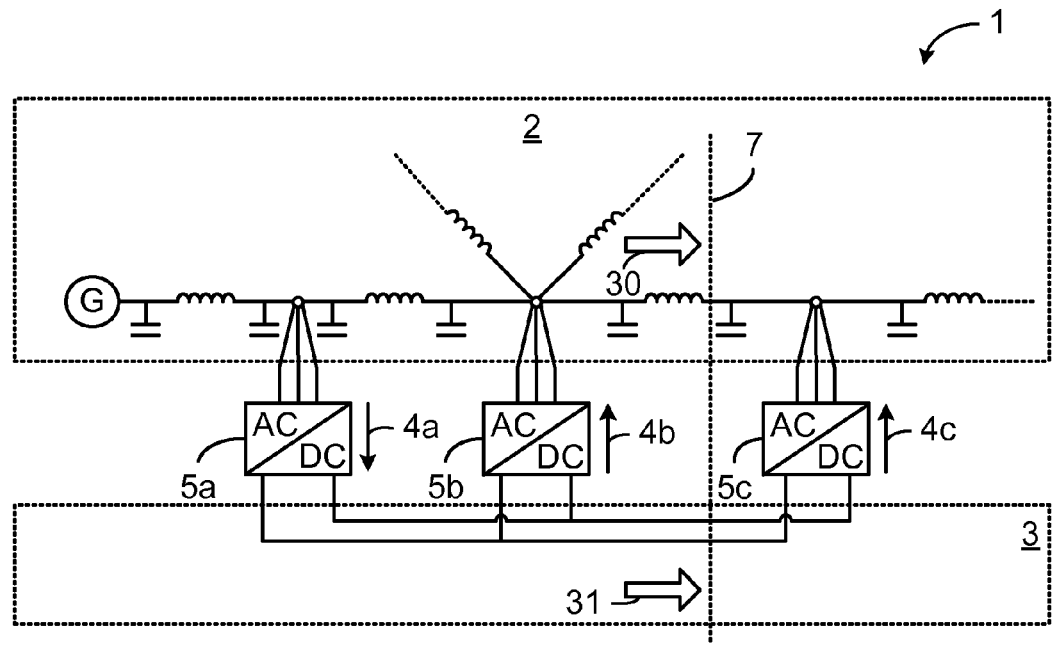
FIG. 1 is a schematic diagram showing a transmission system during normal operation.

FIG. 1 is a schematic diagram showing a transmission system 1 during normal operation. The transmission system comprises an AC grid 2 and a DC grid 3. In this example, there are three AC/DC converters 5a-c provided at three different locations. The AC/DC converters 5a-c can be unidirectional in either direction or bidirectional. In this embodiment, all the AC/DC converters 5a-c are bidirectional. Both the AC grid 2 and the DC grid 3 contribute to transferring power to the right in FIG. 1, as indicated by the two wide arrows 30, 31. In this way, sufficient capacity is provided to transfer electrical power past a bottleneck 7.

Each one of the three AC/DC converters convert power in a direction of power 4a-c. The arrows 4a-c indicate how the first AC/DC converter 5a converts power from AC to DC, the second AC/DC converter 5b converts power from DC to AC and the third AC/DC converter 5c converts power from DC to AC. In other words, part of the power passing through the first AC/DC converter 5a is converted back to AC by the second AC/DC converter 5b. The remaining power from the first AC/DC converter 5a is transferred to the third AC/DC converter 5c for conversion back to AC.

Figure 2A:
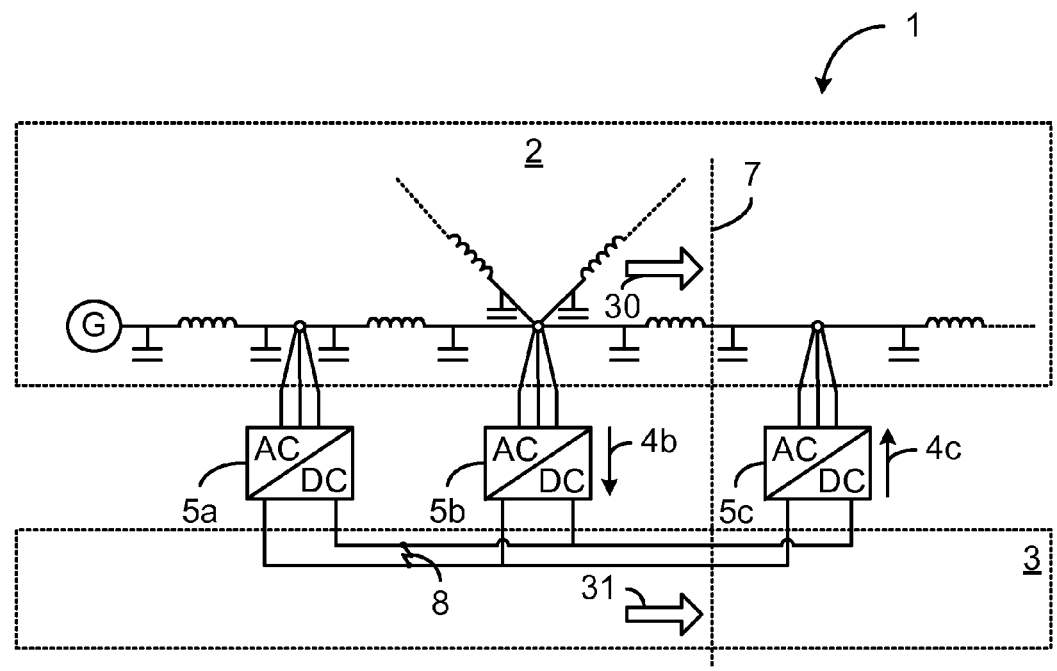
FIGS. 2A-B are schematic diagrams showing two potential scenarios in the transmission system of FIG. 1 when a fault occurs.
Figure 2B:
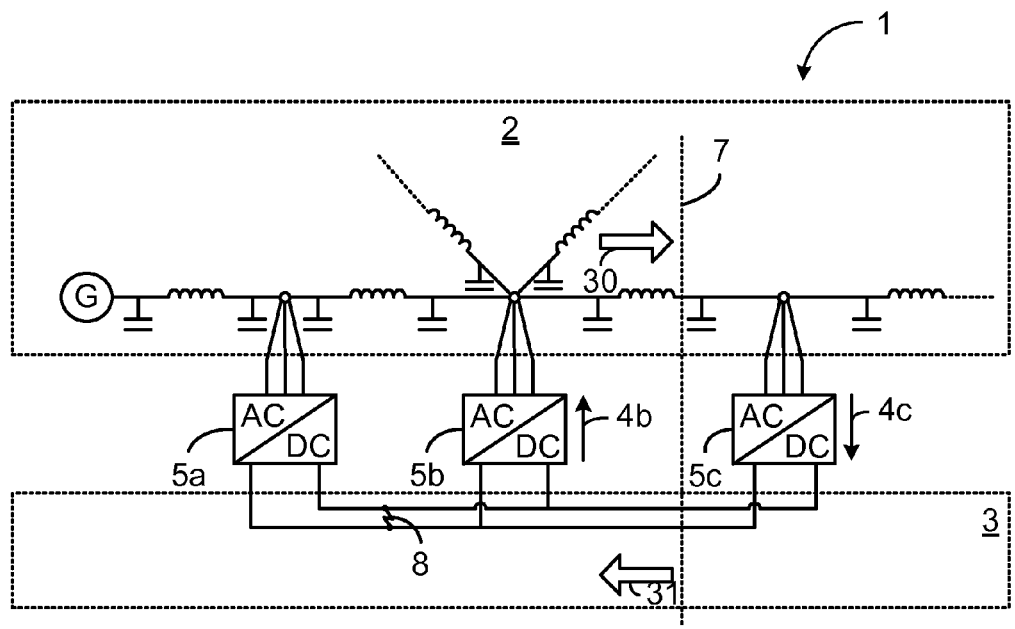

FIGS. 2A-B are schematic diagrams showing two potential scenarios in the transmission system of FIG. 1 when a fault occurs. Here, a fault 8 occurs on the transmission line between the first and second AC/DC converters 5a-b. The fault prevents the first AC/DC converter 5a from supplying power to or from the DC grid 3.

However, the behaviour of the second AC/DC converter 5b and the third AC/DC converter 5c is undefined. In the normal state shown in FIG. 1, both the second and third AC/DC converters 5b-c convert power from DC to AC. This is unsustainable when no power is supplied on the DC grid 3 from the first AC/DC converter 5a. Hence, at least one of the second and third AC/DC converters 5b-c need to change its operation to achieve power balance on the DC grid 3.

In FIG. 2A a scenario is shown where the second AC/DC converter 5b changes its direction 4b of power transfer to supply power to the DC grid 3. This results in power being continued to be supplied in a direction from left to right across the bottleneck 7, which is a desired scenario.

In FIG. 2B a scenario is shown where the third AC/DC converter 5c changes its direction 4c of power transfer to supply power to the DC grid 3. This results in power now being supplied in a direction from right to left across the bottleneck 7. This is not only a problem in that the DC grid 3 does not contribute in power transfer from left to right across the bottleneck 7, but also in that the power converted to AC by the second AC/DC converter 4b now also has to be transferred by the AC grid 2 across the bottleneck 7, aggravating the situation even more.

In another scenario (not shown), both the second and third AC/DC converters 5b-c are controlled to shut down, whereby the DC grid fails to transfer any power over the bottleneck 7 (from left to right) as desired.

In the prior art, it has not been shown how to set a satisfactory control strategy in advance, defining how the system is going to react for various faults shown above, whereby either one of the scenarios of FIGS. 2A-B is possible.

Figure 3:
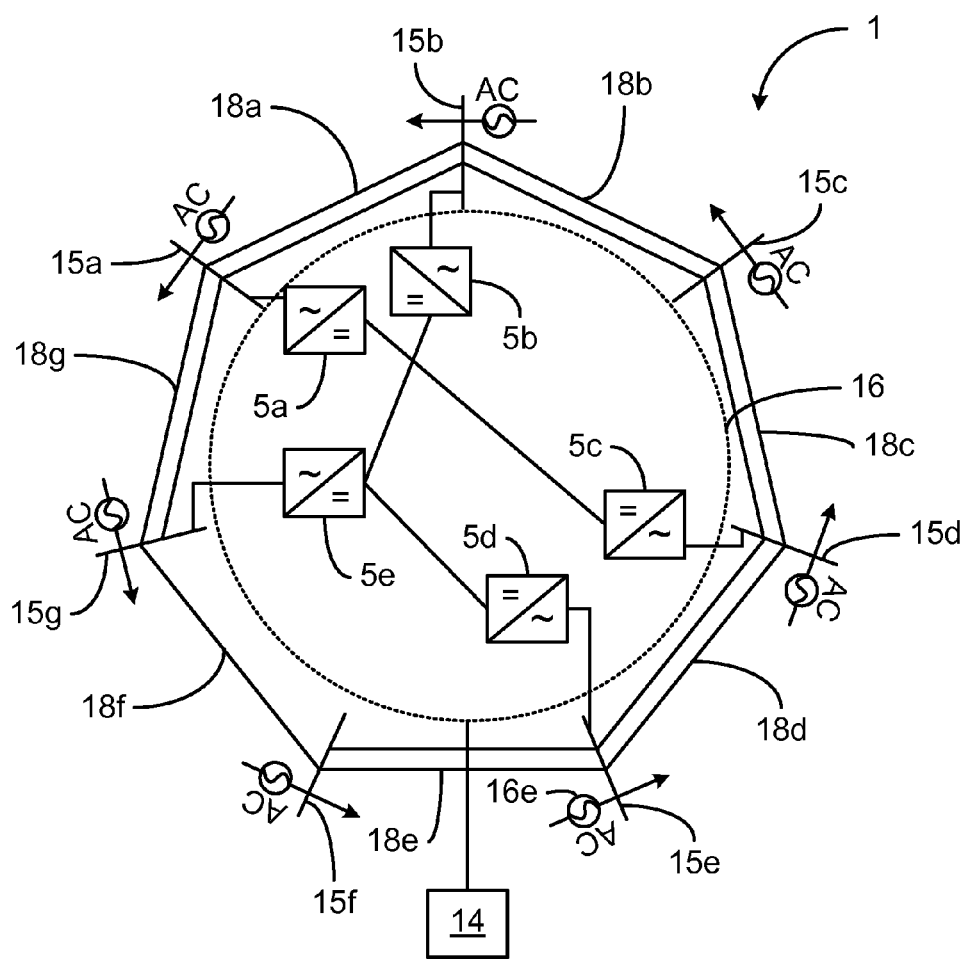
FIG. 3 is a schematic diagram of a transmission system.

FIG. 3 is a schematic diagram of a more complicated transmission system 1. There are seven points 15a-g. In the transmission system 1, there are dual transmission lines 18a-e between all points, except for between the sixth and seventh points 15f-g, where there is a single transmission line 18f. The transmission lines between the transmission points all form part of an AC grid, similar to the AC grid 2 of FIGS. 1, 2A-B.

In the embodiment of FIG. 3, there are five AC/DC converters 5a-e. The AC/DC converters 5a-e are connected on the DC side using DC transmission lines. These DC transmission lines form a DC grid, such as the DC grid 3 of FIGS. 1, 2A-B. However the DC grid of FIG. 3 is more complex, whereby its behaviour, particularly when exceptions such as faults occur, is difficult to predict and control. The AC/DC converters 5a-e and the DC grid are herein collectively called a DC transmission system 16.

A controller 14 is responsible for controlling the AC/DC converters 5a-e.

It is to be noted that, although not shown in FIG. 3, there may be DC nodes which are not directly connected to an AC/DC converter. Moreover, the DC grid could optionally comprise power flow controllers and DC/DC converters.

Figure 4:
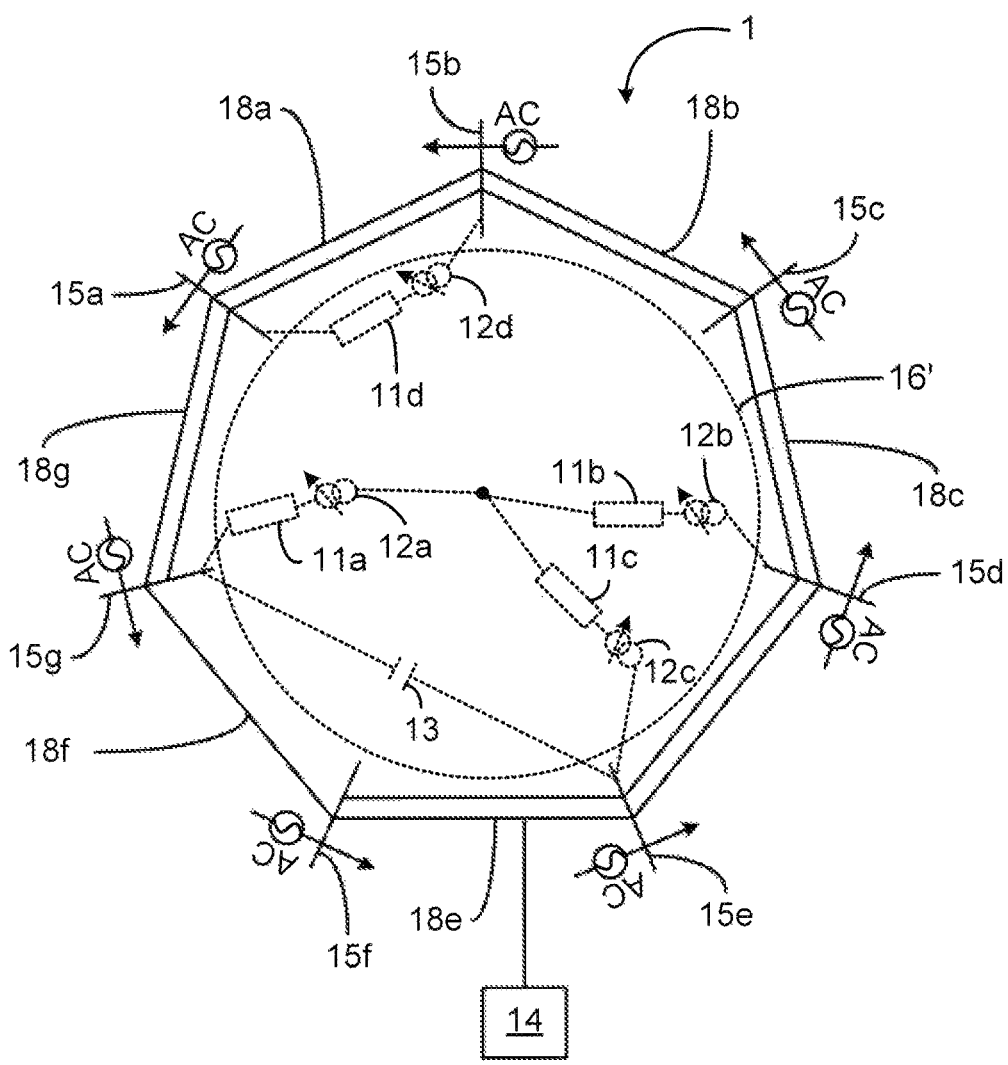
FIG. 4 is a schematic diagram representing a model of the transmission system of FIG. 3.

FIG. 4 is a schematic diagram representing a model of the transmission system 16 of FIG. 3. This will be explained with further reference to FIG. 5. Here, the DC transmission system 16 is modelled as a virtual AC grid 16'. The modelling is described in more detail below with reference to the flow chart of FIG. 5, but is in short based on set points for the AC/DC converters 5a-e during normal operation. Set point in this context comprises a magnitude and direction of power through the respective AC/DC converter 5a-e.

Figure 5:
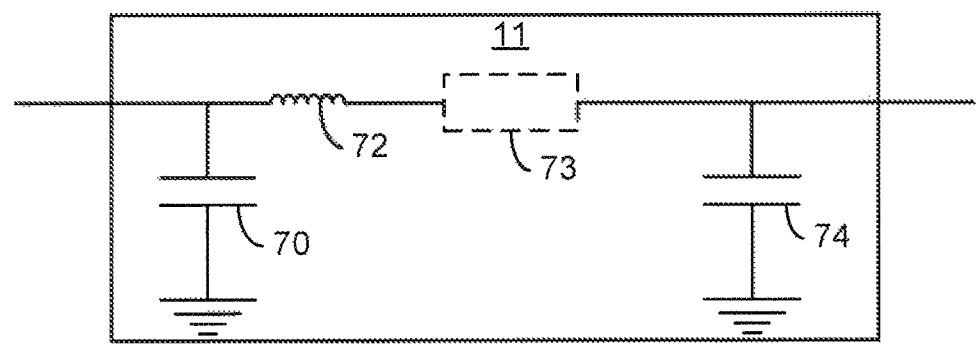
FIG. 5 is a schematic diagram showing one example of passive components of FIG. 4.

The virtual AC grid 16' here comprises four passive components 11a-d, a capacitor 13 and three phase shifting transformers 12a-d. Also, the branches, i.e. transmission lines, of the virtual AC grid 16' can differ from the actual transmission lines of the DC grid as shown in FIG. 3. FIG. 5 is a schematic diagram of one example of passive components 11*a-d* of FIG. 4. In this embodiment, the passive component is a combination of components in the form of a pi link. Hence, there is an inductor 72 and an optional resistor 73 coupled in series between the terminals. On either side of the inductor and optionally resistor, two respective capacitors 70, 71 are provided connected to ground. This is a common model of transmission lines. Once the virtual AC grid 16' is established, the transmission system 1 can be treated as a pure AC system. The controller 14 then controls the AC/DC converters (shown in FIG. 3) to mimic the behaviour in accordance with virtual AC grid 16'. In this way, the direction of power will be maintained as desired, whereby a scenario with undesired power flow directions, such as the one shown in FIG. 2B, is prevented.

Figure 6:
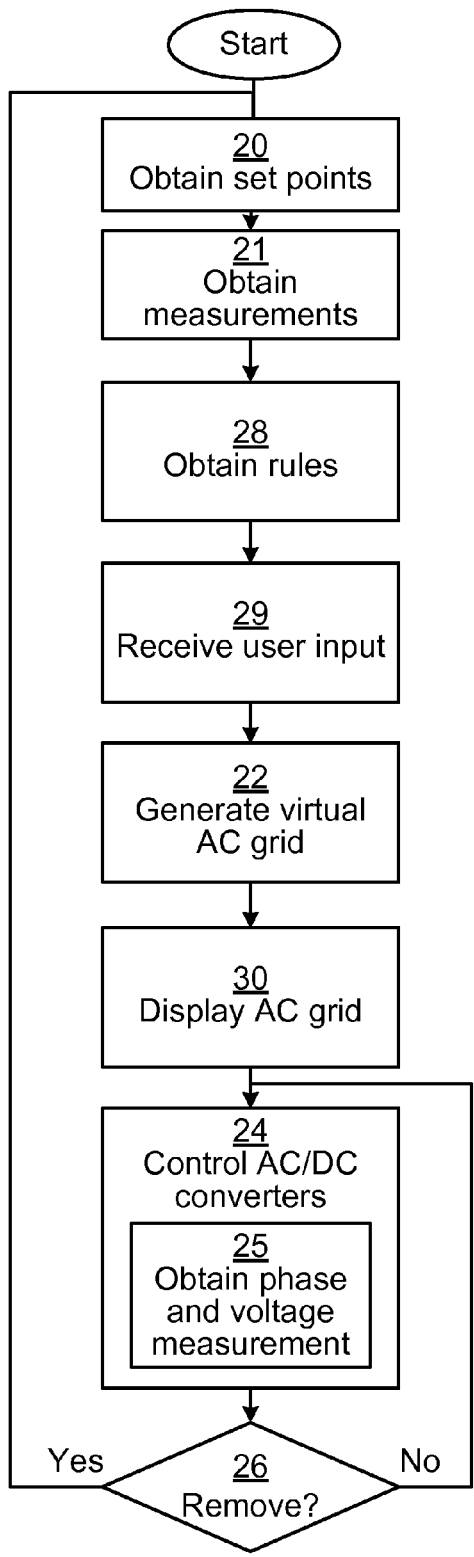
FIG. 6 is a flow chart illustrating a method executed in the transmission system of FIGS. 3-4.

FIG. 6 is a flow chart illustrating a method executed in the transmission system of FIGS. 3-4.

In an initial obtain set points step 20, set points for each one of the AC/DC converters 5*a-e* (FIG. 3) are obtained. As explained above, each set point comprising a magnitude (real, complex or pure imaginary, e.g. represented as phasors or in a polar coordinate system) and direction of power through the respective AC/DC converter 5*a-e* during normal operation. In this context, normal operation should be interpreted as a steady state where no major faults are present in the transmission system.

In an obtain measurements step 21, measurements are obtained for each one of the at least two AC/DC converters 5*a-e*. The measurements can e.g. be a voltage magnitude and voltage angle on the AC side of each one of the at least two AC/DC converters.

In an optional obtain rules step 28, rules are obtained which are to be used for subsequent virtual AC grid generation. The rules can be a configuration, e.g. limiting parameter values of virtual components in the resulting virtual AC grid.

In an optional receive user input step 29, user input is received to add a virtual component in the virtual AC grid. Alternatively or additionally, virtual AC grid components could be removed or modified.

In a generate virtual AC grid step 22, a virtual AC grid 16' is generated, based on the set points of the AC/DC converters. The virtual AC grid 16' corresponds to AC behaviour of the DC grid, as viewed from each AC side of the at least two AC/DC converters 5*a-e*.

Optionally a matrix is generated, describing the relationship between current and voltage between each one of the AC/DC converters through the DC grid. For example, this matrix can be an admittance matrix which is used to model the virtual AC grid.

An admittance matrix is typically used for modelling an AC system. The currents and voltages are then be represented by elements in the admittance matrix, which establishes a relation between complex currents and voltages. For a grid with passive components (resistors, inductors and capacitors) this admittance matrix is symmetrical and diagonal. Devices such as phase shifting transformers create unsymmetrical conditions in the admittance matrix and cannot be realized with passive components only.

An asynchronous AC grid can be represented as a rotating electrical machine (such as a generator and/or motor) in the virtual AC grid. In fact the virtual AC grid can comprise any number of virtual components, such as one or more inductors, resistors, capacitor, rotating electrical machines. The virtual components can even be selected to be negative resistors or memristors.

Whenever rules have been obtained in the optional obtain rules step 28, the generating the virtual AC grid step 22 comprises generating the virtual AC grid based on the rules.

Moreover, whenever user input has been received in the receive user input step 29, the step of generating the virtual AC grid 22 comprises generating the virtual AC grid comprising the virtual component of the user input. Optionally, a machine generated virtual AC grid is created first, after which an operator may modify the AC grid. In such an embodiment, the receive user input step 29 in fact occurs after the generate virtual AC grid step 22.

In an optional display AC grid step 30, a graphical representation of the virtual AC grid is displayed. In this way, an operator can understand the DC grid by examining the virtual AC grid. This can be particularly useful in situations where the operator is more accustomed to control AC grids than DC grids. Also, this reduces the complexity by not needing to consider the AC/DC conversions.

In a control AC/DC converters step 24, the controller 14 (FIG. 3-4) controls the AC/DC converters 5*a-e* to mimic a behaviour in accordance with the virtual AC grid. In this step, this control is performed, e.g. by sending new reference values to the AC/DC converters. In one embodiment, in line with the operation of a real AC grid, the controlling attempts to maintain constant (virtual) impedance of the virtual AC grid. In such a control, the power may vary. The virtual impedance can e.g. be a virtual inductance. In another example, some virtual impedances could be allowed to vary on some virtual AC lines, e.g. to dampen electromagnetic oscillations in the surrounding, real, AC grid.

Optionally, this controlling comprises an obtain phase and voltage measurement sub-step 25 in order to obtain control measurements of voltage magnitude and voltage phase angle for every other one of the at least two AC/DC converters connected to the same AC grid. Optionally, this step comprises low pass filtering the control measurements with low pass filter of a frequency which is lower than a frequency corresponding to a time delay of communicating the control measurements. In this way, the control does not react to control measurements which vary faster than the controller can perform any adjustments.

Optionally, the controlling comprises controlling to maintain a constant voltage phase angle, within a margin of error, on the AC side of each one of the AC/DC converters. The margin of error can e.g. be +−10%.

Optionally, the controlling comprises controlling to maintain the magnitude of each phase angle less than the magnitude of each corresponding phase angle during normal operation. The phase angles are again on the AC side of each one of the AC/DC converters. In other words, the phase angles are prevented from increasing in absolute value relative to the initial phase angle Optionally, the AC/DC converters are controlled to mimic only active power behaviour in accordance with the virtual AC grid. This means that the reactive power control capability of the AC/DC converters can be used for controlling the AC voltages at the connection points to the DC grid to desirable values. For example, the DC grid could be represented by a virtual AC grid with virtual AC lines connected to virtual devices for reactive power compensation, such as STATCOM (Static Synchronous Compensator) units or SVC (Static VAR compensation) units. This provides for voltage control at the AC connection points to the DC grid.

Optionally, the AC/DC converters are controlled to mimic only reactive power behaviour in accordance with the virtual AC grid.

Figure 7:
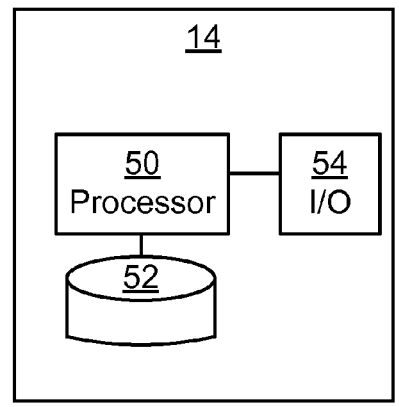
FIG. 7 is a schematic diagram of a controller of the transmission system of FIGS. 3-4.

FIG. 7 is a schematic diagram of a controller 14 of the transmission system of FIG. 3. A processor 50 is provided using any suitable central processing unit (CPU), microcontroller, digital signal processor (DSP), Application Specific Integrated Circuit (ASIC), Field Programmable Gate Array (FPGA), etc., optionally capable of executing software instructions stored in a computer program product 52 e.g. in the form of a memory. The computer program product 52 can be a memory or any combination of read and write memory (RAM) and read only memory (ROM). The memory also comprises persistent storage, which, for example, can be any single one or combination of magnetic memory, optical memory, or solid state memory or even remotely mounted memory.

The controller 14 also comprises an I/O interface 54 for communicating with external entities, such as the AC/DC converters 5*a-e* (FIG. 3) and operation and maintenance systems, etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method executed in a transmission system, the transmission system comprising an AC grid, a DC grid and at least two AC/DC converters connected between the AC grid and DC grid, the method comprising the steps of:
    obtaining set points for each one of the at least two AC/DC converters, each set point comprising a magnitude and direction of power through the respective AC/DC converter during normal operation;
    obtaining measurements for each one of the at least two AC/DC converters;
    generating, based on the set points and the measurements, a virtual AC grid, the virtual AC grid corresponding to AC behaviour of the DC grid, as viewed from each AC side of the at least two AC/DC converters; and
    controlling the at least two AC/DC converters to mimic a behaviour in accordance with the virtual AC grid.

2. The method according to claim 1, wherein the step of controlling comprises controlling the at least two AC/DC converters to mimic only active power behaviour in accordance with the virtual AC grid.

3. The method according to claim 1, wherein the step of controlling comprises controlling the at least two AC/DC converters to mimic only reactive power behaviour in accordance with the virtual AC grid.

4. The method according to claim 1, wherein the step of generating a virtual AC grid comprises generating a matrix describing the relationship between current and voltage between each one of the at least two AC/DC converters through the DC grid.

5. The method according to claim 4, wherein the matrix is an admittance matrix for the virtual AC grid.

6. The method according to claim 1, wherein the step of controlling comprises the sub-step, for each one of the at least two AC/DC converters, of:
    obtaining control measurements of voltage magnitude and voltage phase angle of the AC side of every other one of the at least two AC/DC converters.

7. The method according to claim 6, wherein the step of obtaining control measurements comprises low pass filtering the measurements with low pass filter of a frequency being lower than a frequency corresponding to a time delay of communicating the measurements.

8. The method according to claim 1, wherein the step of controlling comprises controlling to maintain a constant voltage phase angle, within a margin of error, on the AC side of each one of the at least two AC/DC converters.

9. The method according to claim 1, wherein the step of controlling comprises controlling to maintain the magnitude of each phase angle less than the magnitude of each corresponding phase angle during normal operation, the phase angles being on the AC side of each one of the at least two AC/DC converters.

10. The method according to claim 1, wherein an asynchronous AC grid is represented as a rotating electrical machine in the virtual AC grid.

11. The method according to claim 1, further comprising the step of:
    obtaining rules to be used for virtual AC grid generation;
    and wherein the step of generating the virtual AC grid comprises generating the virtual AC grid based on the rules.

12. The method according to claim 1, further comprising the step of:
    receiving user input to add a virtual component in the virtual AC grid; and
    wherein the step of generating the virtual AC grid comprises generating the virtual AC grid comprising the virtual component.

13. The method according to claim 12, wherein the virtual components are selected from the group consisting of, inductors, resistors, capacitors, rotating electrical machines and phase shifting transformers.

14. The method according to claim 13, wherein one or more of the virtual components are selected to be a negative resistor or a memristor.

15. The method according to claim 1, further comprising the step of:
    displaying a graphical representation of the virtual AC grid.

16. The method according to claim 1, wherein the step of obtaining measurements comprises obtaining a voltage magnitude and a voltage angle of the AC side of each one of the at least two AC/DC converters.

17. A transmission system comprising an AC grid, a DC grid, at least two AC/DC converters connected between the AC grid and DC grid, and a controller, the controller being arranged to:
    obtain set points for each one of the at least two AC/DC converters, each set point comprising a magnitude and direction of power through the respective AC/DC converter during normal operation;
    obtain measurements for each one of the at least two AC/DC converters;
    generate, based on the set points, a virtual AC grid, the virtual AC grid corresponding to AC behaviour of the DC grid, as viewed from each AC side of the at least two AC/DC converters; and
    control the at least two AC/DC converters to mimic a behaviour in accordance with the virtual AC grid.

18. The method according to claim 2, wherein the step of generating a virtual AC grid comprises generating a matrix describing the relationship between current and voltage between each one of the at least two AC/DC converters through the DC grid.

19. The method according to claim 3, wherein the step of generating a virtual AC grid comprises generating a matrix describing the relationship between current and voltage between each one of the at least two AC/DC converters through the DC grid.

20. The method according to claim 2, wherein the step of controlling comprises the sub-step, for each one of the at least two AC/DC converters, of:

obtaining control measurements of voltage magnitude and voltage phase angle of the AC side of every other one of the at least two AC/DC converters.

\* \* \* \* \*